United States Patent [19]

Leva

[11] 4,146,209
[45] Mar. 27, 1979

[54] GATE VALVE

[75] Inventor: Larry D. Leva, Houston, Tex.

[73] Assignee: Armco Steel Corporation, Middletown, Ohio

[21] Appl. No.: 858,671

[22] Filed: Dec. 8, 1977

[51] Int. Cl.² ............................................. F16K 25/00
[52] U.S. Cl. .................................. 251/168; 251/196; 251/197
[58] Field of Search ............... 251/167, 168, 196, 197, 251/200, 202

[56] References Cited

U.S. PATENT DOCUMENTS

| 2,502,689 | 4/1950 | Yant | 251/167 |
| 2,653,789 | 9/1953 | Eichenberg | 251/196 X |
| 2,826,391 | 3/1958 | Bredtschneider | 251/167 |
| 2,876,986 | 3/1959 | Knox | 251/200 |
| 3,349,789 | 10/1967 | Crain | 251/200 X |
| 3,434,692 | 3/1969 | Tillman | 251/202 |

Primary Examiner—Harold W. Weakley
Attorney, Agent, or Firm—Melville, Strasser, Foster & Hoffman

[57] ABSTRACT

A through conduit gate valve having a carrier frame shiftable vertically in a valve chamber with gates mounted in the carrier frame as to be shiftable vertically in the carrier frame and as to be shiftable away from each other in the carrier frame. Means are provided on the carrier frame and on the gates to shift the gates toward valve seats and away from each other when the carrier frame is in the open and closed positions and to permit the gates to shift toward each other when the carrier frame is being shifted between its open and closed positions.

5 Claims, 6 Drawing Figures

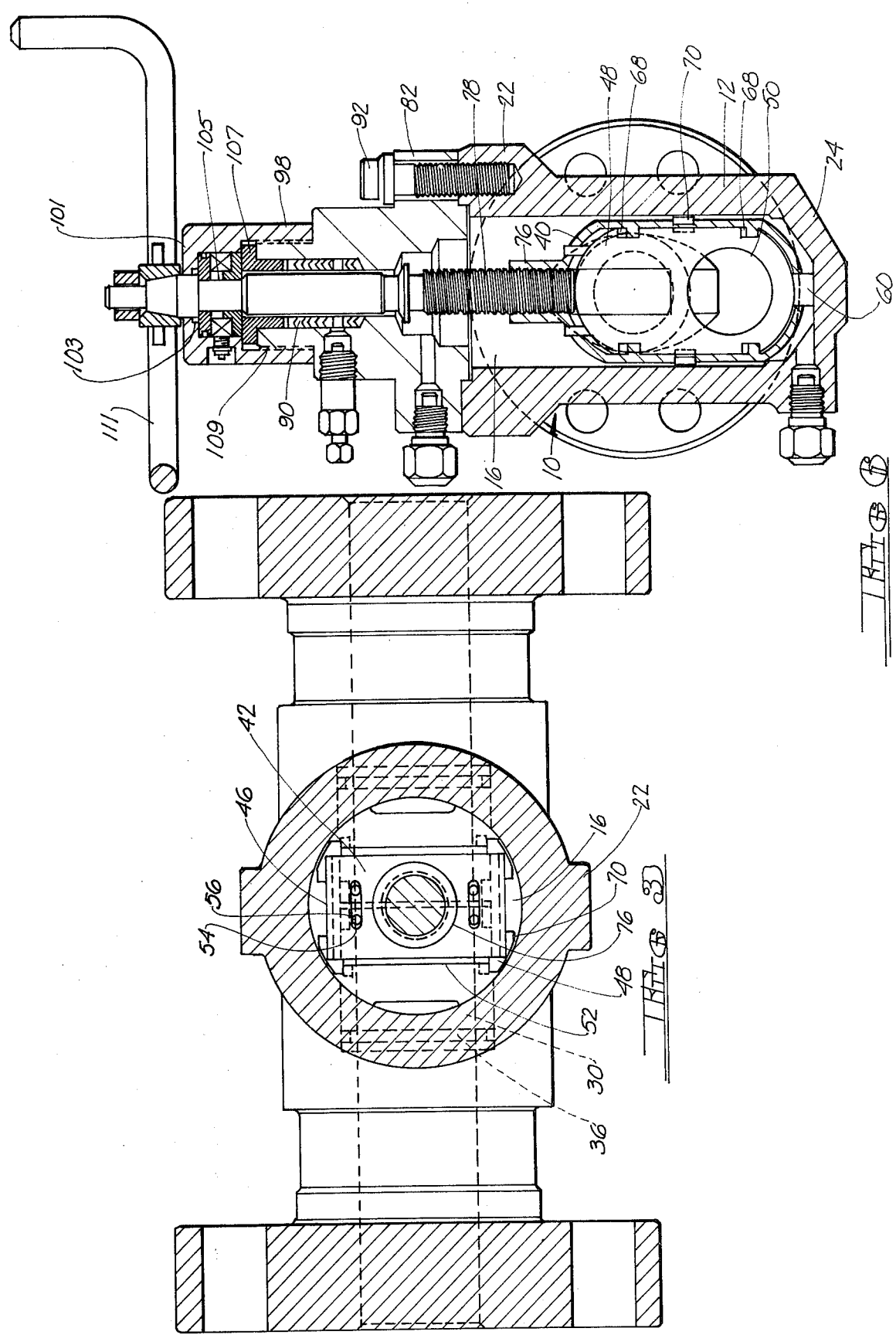

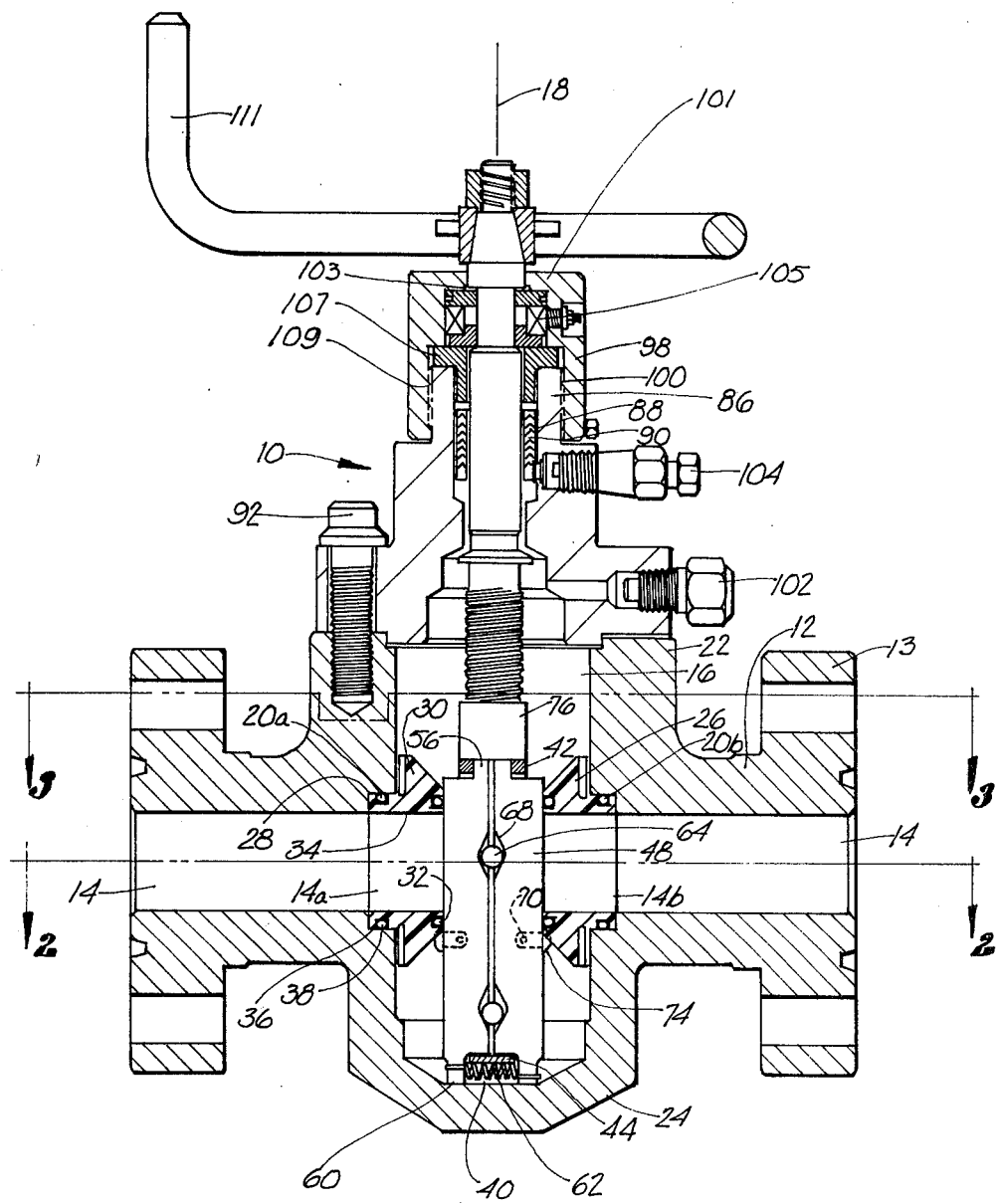

GATE VALVE

BACKGROUND OF THE INVENTION

1. Field of the Invention

This invention relates to new and useful improvements in gate valves and more particularly to reducing the torque by reducing the drag on the gate and to reducing the erosion on the gate and valve seat sealing surfaces.

2. Description of the Prior Art

Gate valves, particularly through conduit gate valves, which when opened present an unbroken smooth wall conduit for uninterrupted passage of flow therethrough, are widely used because of their desirable flow characteristics. For example, when such valves are in the opened position, the straight through passage, which is provided, offers no more appreciable resistance to fluid flow than an equal length of pipe. Although good flow characteristics are important, an even more important aspect of any valve is its ability to seal.

A major problem attributable to high pressure gate valves is the problem of actuating stem torque. The excessive stem torque is caused when sliding the gate across the seat while sealing pressure. Additionally, while the prior art has long endeavored to solve the problem of the erosion on the gate and the valve seat sealing surfaces, a satisfactory solution has not yet been found. Erosion occurs primarily at the instant the conduit opening of the gate starts to open into the conduit opening of the seat. The full pressure is being throttled through this orifice resulting in very high fluid velocities which generate localized erosion.

SUMMARY OF THE INVENTION

The present invention provides a gate valve having a valve body formed with a flow passage. A cylindrical valve chamber having a vertical axis is formed in the valve body and intersects the flow passage to define diametrically opposed inlet and outlet openings in the chamber. The flow passage at the position of the openings in the chamber is provided with a portion of slightly enlarged diameter.

A pair of identical valve seats, each valve seat having a cylindrical portion and a nose portion, the nose portion terminating in a planar portion and the valve seat having a bore extending therethrough, is provided with the cylindrical portion of each valve seat being secured within the enlarged diameter portion of the flow passage at one end of the openings. The nose portion of each valve seat is located within the valve chamber and the bores of the valve seats are coaxial and constitute extensions of the flow passages.

A carrier frame is shiftable vertically in the valve chamber between a valve open and a valve closed position. A pair of mirror image gates are located within the carrier frame in face to face relationship with coaxial openings in the lower portion thereof, the surfaces of the gates facing the valve seats being planar. The coaxial openings in the gates are coaxial with the bores in the valve seats when the carrier frame is in the open position and no longer communicate with the bores in the valve seats when the carrier frame is in its closed position. The gates are so mounted in the carrier frame as to be shiftable vertically in the carrier frame and as to be shiftable toward and away from each other in the carrier frame.

Finally, means are provided on the carrier frame and on the gates to shift the gates toward the valve seats and away from each other when the carrier frame is in the open and closed positions and to permit the gates to shift toward each other when the carrier frame is being shifted between its open and closed positions.

In practice, the means on the carrier frame and on the gates to shift the gates comprises a pair of cylindrical bosses on the inside elongated surface of each elongated side of the carrier frame and a recessed camming surface on each side of each of the gates adapted to cooperate with their respective one of the bosses.

Finally, according to the present invention pressure relief wedges may be located on either side of the carrier frame, with each wedge being associated with a respective groove in a valve seat, so as to align the gates and the carrier frame as the carrier frame is shifted vertically in the valve chamber. The pressure relief wedges are slightly tapered so as to force the gates away from the surface of the valve seats, breaking the pressure tight seal between the seat and the gate.

The improved gate valve of the present invention will reduce the operating torque on the valve stem by eliminating the sliding friction of the gate against the seat face caused by the pressure. The means on the carrier frame and on the gates to shift the gates forces the gates to move away from the valve seats. Finally, the pressure release wedges reduce the concentration of erosion on the seat and gate sealing surfaces.

BRIEF DESCRIPTION OF THE DRAWINGS

FIG. 3 is a cross sectional view taken along the line 3—3 of FIG. 4.

FIG. 4 is a fragmentary view, partially in cross section, taken along the line 4—4 of FIG. 2 showing the carrier frame in the closed position.

FIG. 6 is a fragmentary view, partially in cross section, taken along the line 6—6 of FIG. 2

DESCRIPTION OF THE PREFERRED EMBODIMENTS

Figures 1, 2:
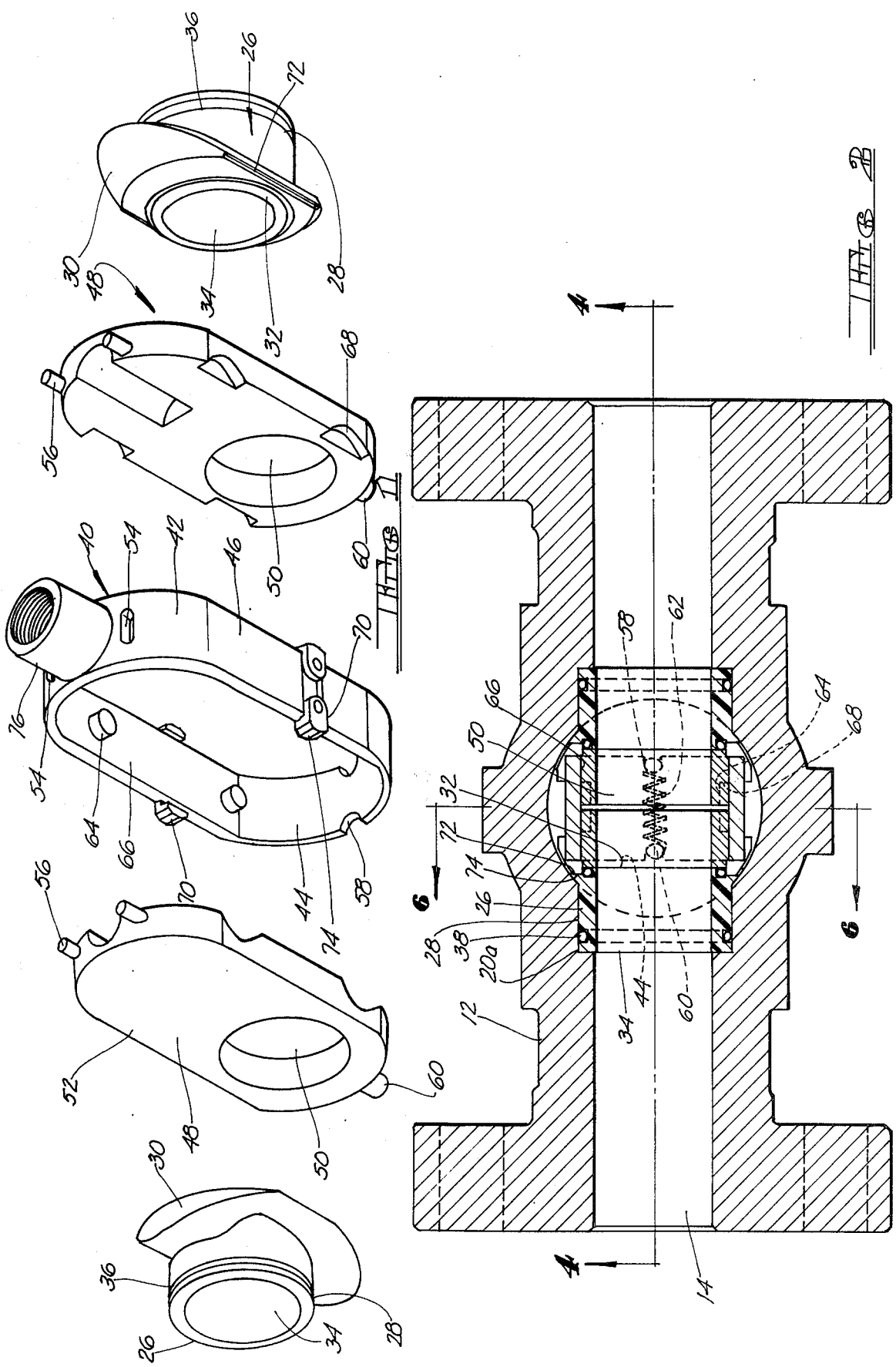
FIG. 1 is a fragmentary exploded view of the gate valve of the present invention showing the carrier frame, gates and valve seats.
FIG. 2 is a cross sectional view taken along the line 2—2 of FIG. 4.

Referring to the drawings, shown therein and generally designated by the reference character 10 is a gate valve, constructed in accordance with the present invention. The gate valve 10 includes a valve body 12 formed with a flow passage 14. A cylindrical valve chamber 16 having a vertical axis 18 is formed in the valve body 12 and intersects the flow passage 14 to define diametrically opposed inlet and outlet openings 14a and 14b, respectively, in the valve chamber 16. However, it will be understood that either of the openings 14a and 14b can serve as either the inlet or the outlet so that the valve 10 may be used to control flow in either direction. The valve body 12 may be provided with flanges 13 adjacent the outer ends of the flow passage 14 to facilitate the connection of the flow passage 14 with suitable conduits (not shown).

The valve body 12, which is preferably cast or forged, includes upper and lower extensions 22 and 24, respectively, and a cylindrical valve chamber 16 extends through the body 12 transversely with respect to the axis of the flow passage 14 and into both extensions 22 and 24. The flow passage 14 at the position of the openings 14a and 14b in the valve chamber 16 has a portion of slightly enlarged diameter 20a and 20b. A pair of identical valve seats 26 are installed in the enlarged diameter portions 20a and 20b of the openings 14a, 14b. Each valve seat 26 has a cylindrical portion 28 and a nose portion 30, the nose portion 30 terminating in a planar portion 32. A bore 34 extends through each valve seat 26. The cylindrical portion 28 of each valve seat 26 is installed within the enlarged diameter portion 20a, 20b of the flow passage 14 at one of the openings 14a, 14b, with the nose portion 30 of each valve seat 26 located within the valve chamber 16 and the bores 34 being coaxial and constituting extensions of the flow passage 14. A cylindrical portion 28 of each valve seat 26 is preferably provided with a groove 36 which receives a suitable seal 38.

A carrier frame 40 having top and bottom portions 42 and 44, respectively, and elongated sides 46 is shiftably mounted for vertical movement within the valve chambers 16 between a valve open and a valve closed position. A pair of mirror image gates 48 are located within the carrier frame 40 in face to face relationship with coaxial openings 50 in the lower portion thereof. The surfaces 52 of the gates 48 facing the valve seats 26 are planar. The coaxial openings 50 in the gates 48 are coaxial with the bores 34 in the valve seats 26 when the carrier frame 40 is in its open position and no longer communicate with the bores 34 in the valve seats 26 when the carrier frame 40 is in its closed position. The gates 48 are so mounted in the carrier frame as to be shiftable vertically with the carrier frame and as to be shiftable toward and away from each other within the carrier frame 40. In this regard, the top portion 42 of the carrier frame 40 is provided with a pair of transverse slots 54 and the upper end of each gate is provided with a pair of extensions or pins 56 each received within one of the slots 54. Two opposed notches 58 are provided in the bottom portion 44 of the carrier frame 40 and each receives an adjacent second extension or pin 60 extending from the bottom portion of each gate 48. The second extension 60 extend below the carrier frame 40 and are joined together by spring means 62. As can thus be seen, the first extensions 56 maintain the gates 48 within the carrier frame 40, while permitting the gates 48 to shift vertically with the carrier frame 40 and toward and away from each other. The second extensions 60 act to stop the movement of the gates 48 on a surface in the chamber 24.

Means are provided on the carrier frame 40 and on the gates 48 to shift the gates 48 toward the valve seats 26 and away from each other when the carrier frame 40 is in the open and closed positions and to permit the gates 48 to shift toward each other when the carrier frame 40 is being shifted between its open and closed positions. Such means on the carrier frame 40 and on the gates 48 to shift the gates 48 comprises a pair of cylindrical bosses 64 on the inside elongated surface 66 of each elongated side 46 of the carrier frame 40 and a recessed camming surface 68 on each side of each of the gates 48 adapted to cooperate with a respective one of the bosses 64.

Pressure relief wedges 70 may be provided on either side of the carriage frame 40 to mate with respective grooves 72 in the planar portion 32 of the valve seat 20 so as to align the gates 48 and the carriage frame 40 as the carriage frame 40 is vertically shifted in the valve chamber 16. The ends 74 of the wedges 70 may be slightly tapered so as to force the gates 48 away from the planar portions 32 of the valve seats 26 and shift the gates 48 toward each other as the carrier frame 40 is moved.

As previously indicated, the carrier frame 40 is vertically shiftable from a position closing the flow passageway 14, in which case the coaxial openings 50 of the gates 48 are out of alignment with the flow passage 14, to a position wherein the flow passage 14 is open, in which case the coaxial gate openings 50 are adapted to be aligned with the flow passage 14. Operating means are provided extending through the valve body 12 into the valve chamber 16 and operatively connected to the carrier frame 40 to move the carrier frame 40, and thus the gates 48, between the aforementioned closed and open positions.

The top portion 42 of the carrier frame 40 is provided with a cylindrical extension 76 which is threaded internally. The stem of the cylindrical operating rod 78 for the valve 10 is provided at its lower end with external threads to engage the internal threads of the extension 76.

A bonnet member 82, having a central aperture 84 for receipt of the stem 78 and a neck portion 86 which forms a packing cavity 88 containing a suitable packing 90, is secured by cap screws 92 to the valve body 12. The packing 90 is retained within the packing cavity 88 by the packing gland 93. A retaining nut 98, provided at its upper end with an inwardly directed flange 101, engages the split ring 103, which engages the single stem thrust bearing 105, which in turn engages the split ring 107, and is screwed onto the thread 109 formed on the upper end of the neck portion 86 of the bonnet member 82. A hand wheel 111 is operatively secured to the end of the stem 78.

Figure 5:
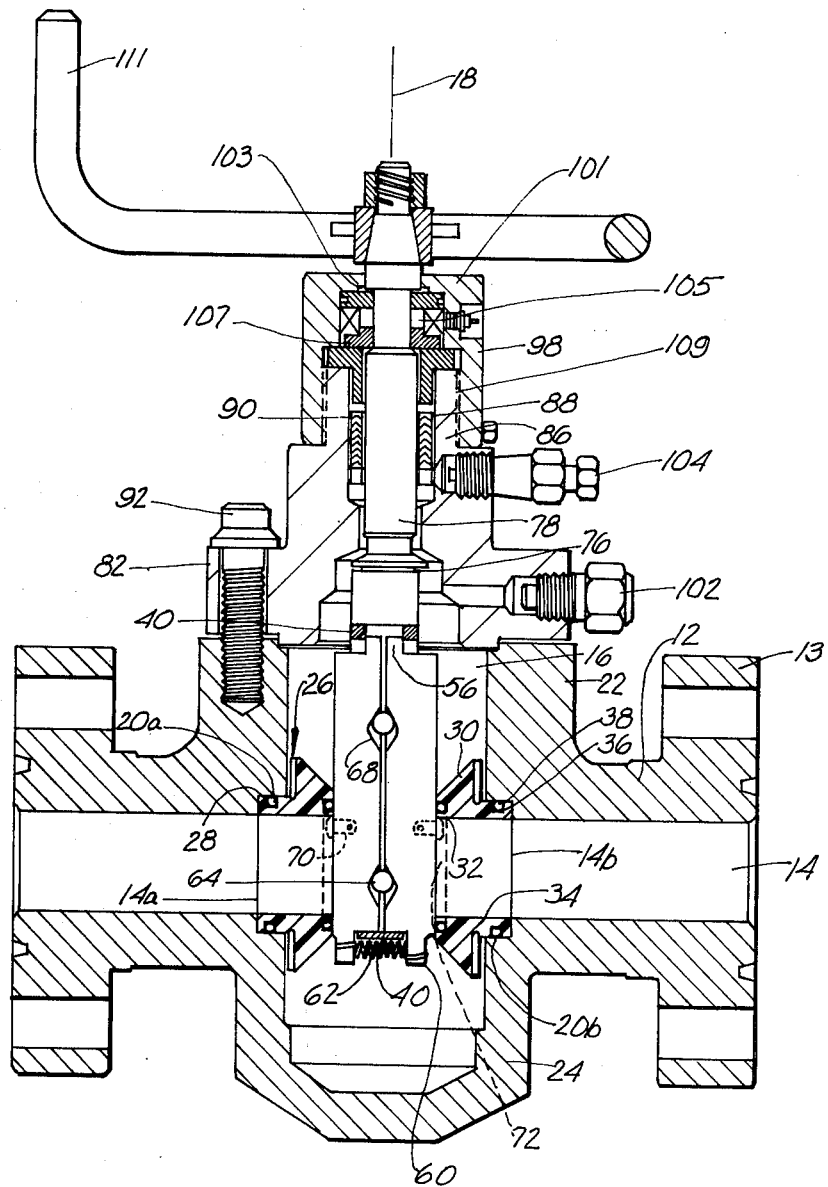
FIG. 5 is a fragmentary view, partially in cross section, similar to FIG. 4 showing the carrier frame in the open position.

As best seen in FIGS. 4 and 5, a port 102 is provided in the bonnet member 82 to permit injection of valve grease for lubricating the movable parts of the valve 10. Similarly, an energizing fitting 104 may be provided in the neck portion 86 of the bonnet member 82 to permit injection of a viscous material to energize the stem packing 90.

During operation of the valve 10, rotation of the hand wheel will rotate the stem 78, causing the carrier frame 40 to vertically shift within the valve chamber 16. The axial up and down movement of the valve stem 78 is limited by the single thrust bearing 105 between the flange 101 and the gland 93. When the carrier frame 40 is in either its open or closed position, the cylindrical bosses 64 on the carrier frame cooperate with their respective recessed camming surfaces 68 on the gates 48 to shift the gates, and thus the planar sealing surfaces 52 thereof, toward their respective planar portions 32 of the valve seats 26 and away from each other. When the carrier frame 40 is moved from the open position to the closed position, or from the closed position to the open position, the pressure relief wedges 70 riding in their respective grooves 72 in the valve seats 26, force the gates 48 away from the planar portions 32 of the valve seats 26, eliminating the pressure induced force of the gate planar sealing surface 52 against the seat planar surface 32 as the carrier frame 40 is shifted, at which time the recessed camming surfaces 68 allow the gates 48 to shift toward each other in the carrier frame 40 with the aid of the spring 62. In this regard, it will be seen that as carrier frame 40 moves downwardly the extensions or pins 60 on the bottom of the gates 48 contact the inside surface of the valve cylinder 16, precluding the gates 48 from moving downwardly, but allowing the carrier frame 40 to continue to move downwardly until the cylindrical bosses 64 fully cam against the camming surfaces 68. Similarly, when the carrier frame 40 moves upwardly, the gates 48 will stop their upward movement when the extensions 56 on the top of the gates 48 contact the bottom surface of the bonnet member 82 through the notches 54. However, the carrier frame 40 may still move upwardly so that the cylindrical bosses 64 are cammed against the camming surface 68, allowing the gate planar surface 52 to be forced against the seat planar surface 32 to protect against foreign matter.

It will, of course, be understood that various resilient materials may be used for the seals, the selection depending somewhat on operating conditions. For example, such seal materials may include synthetic rubbers, such as Hycar or Neoprene. Also other elastomers can be used, such as nylon or Teflon, which are more resistant to certain chemicals and somewhat harder than synthetic rubbers.

In view of the foregoing, it is evident that the present invention eliminates many of the prior art problems in connection with gate valves. The gate valve 10 of the present invention will reduce the operating torque on the stem 78 by balancing pressure across the gates 48 before they start to travel. The pressure release dogs or wedges 70 reduce the concentration of errosion on the seat and gate sealing surfaces 32 and 52, respectively, while providing the means of balancing pressure across the gate. Finally, the cylindrical bosses 64 and their respective mating recessed camming surfaces 68 force the gates 48 to move out uniformly against the seats 26.

It will be understood that certain features and subcombinations are of utility and may be employed without reference to other features and subcombinations. For example, the teachings of the present invention may be utilized with any high pressure through conduit gate valve for gas or liquid. However, it will readily be seen that any other type of valve not requiring a through conduit may also be adapted to the teachings of the present invention.

As many possible embodiments may be made of the invention without departing from the scope thereof, it is to be understood that all matter herein set forth or shown in the accompanying drawings is to be interpreted as illustrative and not in a limiting sense.

The embodiments of the invention in which an exclusive property or privilege is claimed are defined as follows:

1. A gate valve comprising:
   (a) a valve body formed with a flow passage;
   (b) a cylindrical valve chamber having a vertical axis formed in said valve body and intersecting said flow passage to define diametrically opposed inlet and outlet openings in said chamber, said flow passage at the position of said openings in said chamber having a portion of slightly enlarged diameter;
   (c) a pair of identical valve seats, each valve seat having a cylindrical portion and a nose portion, said nose portion terminating in a planar portion and said valve seat having a bore extending therethrough, said cylindrical portion of each said valve seat being installed within the enlarged diameter portion of said valve passage at one of said openings, said nose portion of each said valve seat being located within said valve chamber, said bores of said valve seats being coaxial and constituting extensions of said flow passages;
   (d) a carrier frame shiftable vertically in said valve chamber between a valve open and a valve closed position;
   (e) a pair of mirror image gates located within said carrier frame in face to face relationship with axial openings in the lower portion thereof, the surfaces of said gates facing said valve seats being planar and adapted to seal against said planar portion of said valve seats, said coaxial openings in said gates being coaxial with said bores in said valve seats when said carrier frame is in the open position and no longer communicating with said bores in said valve seats when said carrier frame is in its closed position, said gates being so mounted in said carrier frame as to be shiftable vertically in said carrier frame and as to be shiftable toward and away from each other in said carrier frame; and
   (f) means on said carrier frame and on said gates to shift said gates toward said valve seats and away from each other when said carrier frame is in open and closed positions and to permit said gates to shift toward each other when said carrier frame is being shifted between its open and closed positions.

2. The gate valve according to claim 1, wherein said carrier frame has top and bottom portions and elongated sides, and wherein said means on said carrier frame and on said gates to shift said gates comprises a pair of bosses on the inside elongated surface of each said elongated side of said carrier frame and a recessed surface on each side of each said gate adapted to cooperate with a respective one of said bosses.

3. The gate valve according to claim 1, wherein said carrier frame has top and bottom portions and elongated sides, and wherein said top portion of said carrier frame is provided with a pair of transverse slots, each of said gates having an upper end provided with a pair of first extensions, each received within one of one of said carrier frame slots, said bottom portion of said carrier frame having two opposed notches, said bottom portion of each said gate having a second extension adapted to be received within and to extend below the adjacent one of said carrier frame notches, said second gate extensions below said carrier frame being joined together by spring means, whereby said first and second extensions maintain said gates within said carrier frame, while permitting said gates to shift vertically in said carrier frame and toward and away from each other.

4. The gate valve according to claim 1, wherein pressure relief wedges are provided on either side of said carriage frame and grooves are provided in the planar portion of said valve seat adapted to mate with respective ones of said wedges on said carrier frame so as to align said gates and said carriage frame as said carriage frame is vertically shifted in said valve chamber, the ends of said wedges being slightly tapered so as to force said gates away from said planar portion of said valve seats, relieving pressure as said carrier frame is shifted.

5. The gate valve according to claim 1, wherein said carrier frame has top and bottom portions and elongated sides, and wherein said means on said carrier frame and on said gates to shift said gates comprises a pair of cylindrical bosses on the inside elongated surface of each said elongated side of said carrier frame and a recessed camming surface on each side of each said gate adapted to cooperate with the respective one of said bosses, and wherein the top portion of said carrier frame is provided with a pair of transverse slots, each of said gates having an upper end provided with a pair of first extensions each received within one of said carrier frame slots, said bottom portion of said carrier frame having two opposed notches, each of said gates having a bottom end having a second extension adapted to be received within and to extend below the adjacent one of said carrier frame notches, said second gate extensions below said carrier frame being joined together by spring means, whereby said first and second extensions maintain said gates within said carrier frame, while permitting said gates to shift vertically in said carrier frame and toward and away from each other.

* * * * *